United States Patent [19]

Canada et al.

[11] 4,437,501
[45] Mar. 20, 1984

[54] CONTOURED DUNNAGE CUTTER

[75] Inventors: James W. Canada, Bessemer; James W. Layton, Fultondale, both of Ala.

[73] Assignee: United States Pipe and Foundry Company, Birmingham, Ala.

[21] Appl. No.: 382,014

[22] Filed: May 26, 1982

[51] Int. Cl.³ ............................................. B27C 5/00
[52] U.S. Cl. .......................... 144/136 R; 144/133 R; 144/137; 144/144 R; 144/359
[58] Field of Search ............... 144/2 R, 133 R, 134 R, 144/134 B, 208 R, 208.6, 363, 137, 142, 144 R, 144 A, 359

[56] References Cited

U.S. PATENT DOCUMENTS

| | | | |
|---|---|---|---|
| 2,293,013 | 8/1942 | Bradner et al. | 144/137 |
| 2,736,349 | 2/1956 | Francis | 144/142 R |
| 2,918,096 | 12/1959 | Schiel | 144/144 R X |
| 3,176,734 | 4/1965 | Broadbent | 144/208 G |
| 3,516,463 | 6/1970 | Betzler | 144/144 R |
| 3,779,294 | 12/1973 | Gillis | 144/134 R |
| 4,193,723 | 3/1980 | Novello et al. | 144/144 R |

*Primary Examiner*—W. D. Bray
*Attorney, Agent, or Firm*—James W. Grace; Charles W. Vanecek

[57] ABSTRACT

A contoured dunnage cutter is provided for cutting partially circular arcs in timber dunnage separators, wherein, the partially circular arcs are precisely cut in shape and depth, and spaced at preset distances. The timber dunnage separator is positioned against adjustable stops and held firmly while cutting occurs. A rotating cutter head is pivotally mounted for motion through an arc corresponding to the partially circular arc being cut in the timber dunnage separator.

4 Claims, 2 Drawing Figures

CONTOURED DUNNAGE CUTTER

BACKGROUND OF THE INVENTION

1. Field of the Invention

The present invention is in the field of wood milling. More specifically, the invention provides a contoured dunnage cutter for forming a series of spaced identical arcuate cuts in one or more surfaces of a longitudinal timber or work piece of similar material. The spacing, shape and dimensions of the cuts are predetermined and accurately controlled to provide both support for and separation of lengths of pipe during shipment.

2. Description of the Prior Art

Since large orders of pipes such as ductile iron water pipes may travel thousands of miles by truck, train and ocean freighter in order to reach their final destination, it is necessary to protect each length of pipe from physical damage. Such physical damage might include abrasion from adjacent pipes or crushing pipes stacked above and supported by others. While a straight timber provides support and separation, a straight timber is not suitable for long distance shipping, or in those cases where stacked heights include many layers of pipes stacked one above the other. The straight timber provides only line contact for a short distance and provides no security against horizontal movement perpendicular to the longitudinal axis of the pipes. The present invention provides a contour cutter which will machine timber dunnage separators rapidly and accurately.

Prior art methods of forming such cut surfaces in timber dunnage separators include marking the work piece and sawing with a band saw, or the use of tracer attachments on automatic milling machines. These prior art methods are versatile but are either time consuming or require expensive machinery. The prior art machines employed are capable of performing cuts of various shapes and copying complicated designs, while the present invention provides means of making rapid arcuate cuts and accurately spacing the arcuate cuts along the length of a timber.

SUMMARY OF THE INVENTION

A contoured dunnage cutter is provided which will form spaced, arcuate cuts in the surface of a timber or similar work piece. The dunnage cutter includes a motor driven, rotary cutter mounted on a pivoted base plate wherein the base plate is itself shaft mounted, so it is movable in an arc only. Rotation of the shaft mounted base plate moves the cutter head in an arc which matches the outside surface of the pipe to be supported. A support channel with movable and adjustable stops is provided to allow movement of the work piece to accurately locate the arcuate cuts at predetermined distances along the surface of the work piece. A work piece hold down device is also provided to prevent movement of the work piece while cutting is accomplished. Chip blowers may be provided to prevent chip build-up on certain surfaces. Safety guards and drive covers may also be provided, if desired.

It is an object of the present invention to provide a novel dunnage cutter for cutting spaced, arcuate cuts in a work piece.

It is yet another object of the present invention to provide a novel dunnage cutter for cutting spaced, arcuate cuts in a work piece, which cutter is of simplified construction and is economical to build.

It is yet another object of the present invention to provide a novel dunnage cutter for cutting spaced, arcuate cuts in a work piece, which cutter can be operated with relatively unskilled operators.

Other objects and advantages of the present invention will become apparent to those skilled in the art from a consideration of the attached drawing in which like numerals indicate like elements.

DESCRIPTION OF THE PREFERRED EMBODIMENT

Figure 1:
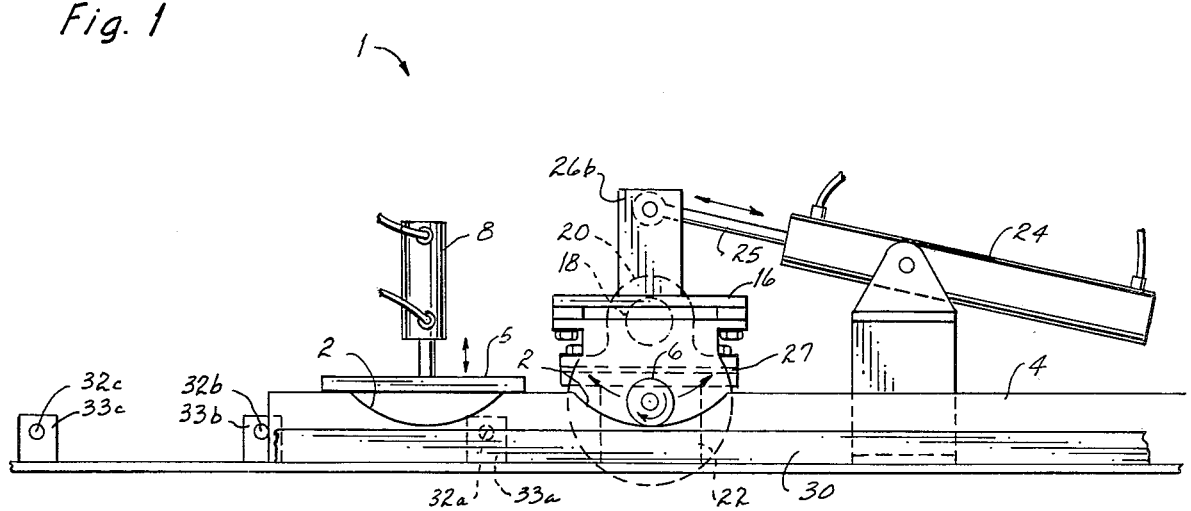
FIG. 1 is a cross-sectional view of a contoured dunnage cutter of the present invention taken along line 1—1 of FIG. 2.

Referring to FIG. 1, there is shown a countoured dunnage cutter 1 for forming arcuate cuts 2 in the surface of timber work pieces 4. Cutter head 6 is preferably a joiner head usually used to make flat cuts but readily adaptable to forming arcuate cuts. Cutter head 6 may be in the form of a cylinder with cutting teeth 7 spaced from each other across the cylinder. The timber work piece 4 is held in place by hold down 5 which is forced against the work piece by fluid powered cylinder 8. Cylinder 8 is held in place by supports (not shown) which may be a welded metal frame suitably placed with respect to the work piece. Cutter head 6 is mounted on shaft 10 (shown in FIG. 2). Shaft 10 is supported for rotation by spaced bearings which are supported on plate 16. Shaft 10 of cutter head 6 connected through coupling 12 to the drive shaft of electric motor 14. Shaft 10 and electric motor 14 are mounted onto plate 16 in such a manner as to allow high speed rotation of cutter head 6. The rotational speed preferred is 3450 rpm. Plate 16 is provided with shafts 18 fixed to its ends and the shafts 18 are placed in bearings 20 mounted onto stands 22 in order that plate 16 may be pivoted about shafts 18. Pivotal motion is imparted to plate 16 by fluid powered cylinder 24 which is attached to plate 16 by means of a drive rod 25, loosely coupled to a pair of spaced plates 26a and 26b. Plates 26a and 26b are welded to the side of plate 16 opposite that supporting the electric motor 14 and cutter head 6. Movement of drive rod 25 causes plate 16 to rotate into preset positions around shaft 18. In turn, cutting head 6 is rotated through an arc of about 120° to form arcuate cuts 2 in the upper surface of work piece 4. This pivotal motion of plate 16 moves cutter head 6 through an arc since its center of rotation is different from that of plate 16. The arc radius may be increased by placing shims 27 under bearings 20. The work piece 4 is guided by a "U" shaped channel 30 though which stops 32a, b, and c, pass to position work piece 4. Stops 32a, b and c, are made of steel rods sliding through holes in two brackets 33a—33a, 33b—33b and 33c—33c.

Mechanical supports and power operating sources for the fluid power cylinders 8 and 24 have been omitted for simplication of the drawing, but their positions and function are well known to those skilled in the art.

The Operation of the Contoured Dunnage Cutter of the Invention

Figure 2:
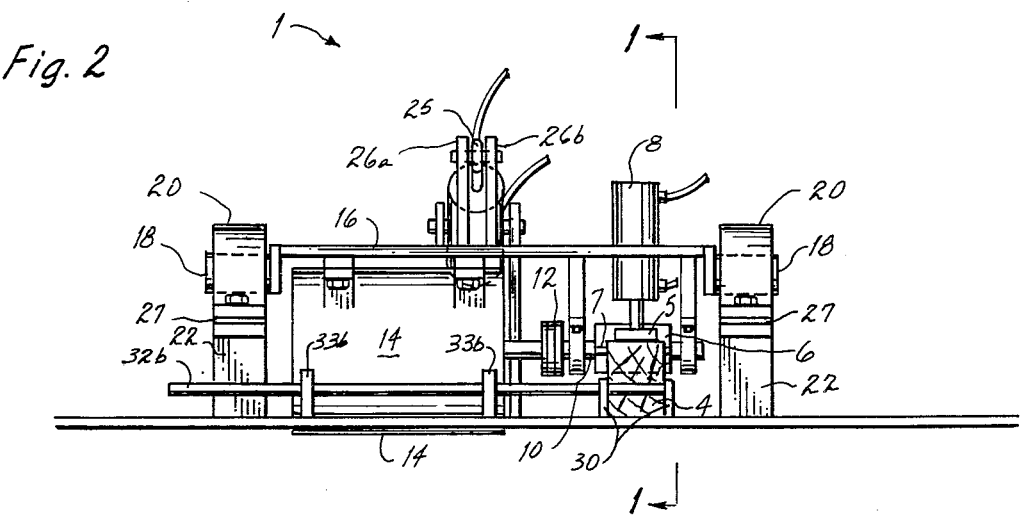
FIG. 2 is an end elevation of the contoured dunnage cutter of the present invention.

The operation of the contoured dunnage cutter 1 to produce spaced arcuate cuts may be described with reference to a timber work piece 4 which is of rectangular cross-sections as shown in FIG. 2. Timber 4 is placed in U-shaped channel 30 at the right hand of edge of the dunnage cutter 1. Timber 4 is advanced to the left until its leading edge meets the stop 32a, nearest the cutter head 6. Motor 14 is turned on and cutter 6 turns in a cutting mode. Cylinder 24 is operated by means of air pressure through suitable hose connection and pushes rod 25 to the left and right. The movement of rod 25, as coupled through plates 26a and 26b, is imparted to plate 16 which rotates around shafts 18 in bearings 20. In its initial position, cutter head 6 is maintained above and clear of the top surface of timber 4. The movement of plate 16 causes motor 14 to move through an arc of about 120° and carry with it arcuate cutter head 6. Cutter 6 forms the first arcuate cut in timber 4. After the first cut 2 is completed, cylinder 24 is energized in reverse to retract rod 25 which in turn returns cutter head 6 to its original position through the operating path formed by plate 16 and motor 14.

After the first arcuate cut 2 has been made, the first stop 32a is withdrawn and the timber 4 is pushed forward (to the left) until it encounters the second stop 32b. Cylinder 8 is energized and hold down plate 5 is held against timber 4 to keep it securely in place while the second cut is performed.

Again through the operation of cylinder 24, the cutter head 6 is moved through its predetermined arc to form arcuate cut 2 a second time.

The distance between consecutive arcuate cuts 2 is determined by the distance between stops 32a and 32b.

It is clear that additional arcuate cuts can be formed in the upper surface of timber 4 by repeating the earlier steps of moving timber 4 to the left to the next stop. For additional arcuate cuts, the number of stops 32 can be increased. Thus, the number of arcuate cuts and their spacing can be predetermined for any selected length of work piece.

If it is desired to change the arc radius of cutter head 6 it is merely required to change the height of stands 22 by adding or subtracting shims 27. Thus, timbers can be prepared which can be cut to accommodate pipes of different diameters.

The present embodiments of this invention are to be considered in all respects as illustrative and not restrictive, the scope of the invention being indicated by the appended claims.

What is claimed is:

1. A contoured dunnage cutter for forming at least one arcuate concave cut at a predetermined location on at least one plane surface of a work piece; said dunnage cutter comprising a shaft mounted cutter head, a drive motor coupled to the shaft of said cutter head, said drive motor and said cutter head being mounted on a support plate, one edge of said support plate being pivotally mounted to a base, means to rotate said plate, motor and cutter head through a predetermined arc of about 120° with a reciprocal movement in and against the direction of the longitudinal axis of said work piece, and means for positioning one surface of said work piece in the arcuate path of said cutter head, said means for positioning including means for guiding said work piece, means for stopping said work piece at a predetermined location and means for holding down said work piece, whereby said cutter head is driven by means of said drive motor to form said arcuate concave cut in said work piece.

2. The dunnage cutter of claim 1 in which means are provided between said plate and said base to provide for adjustably determining the depth and shape of said arcuate concave cut in said work piece.

3. The dunnage cutter of claim 2 in which said means are shims.

4. The dunnage cutter of claim 1 in which said means for stopping said work piece comprises multiple stops spaced from each other at preset distances equal to the desired preset distances between consecutive arcuate concave cuts in said work piece.

* * * * *